July 11, 1950     E. G. SPIETH     2,514,810
ROTARY SCRAPER
Filed Aug. 13, 1946     2 Sheets-Sheet 1
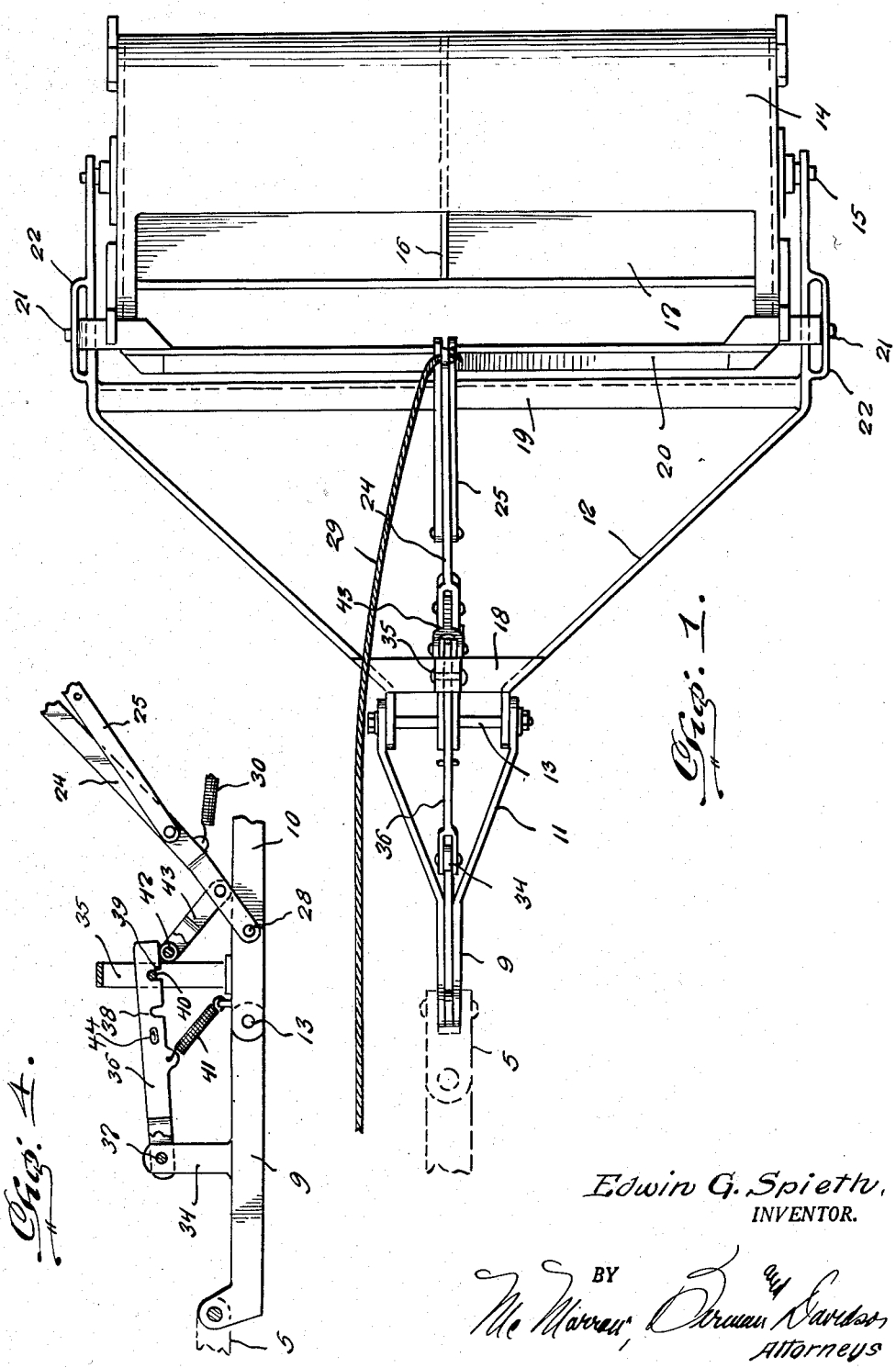
Edwin G. Spieth,
INVENTOR.

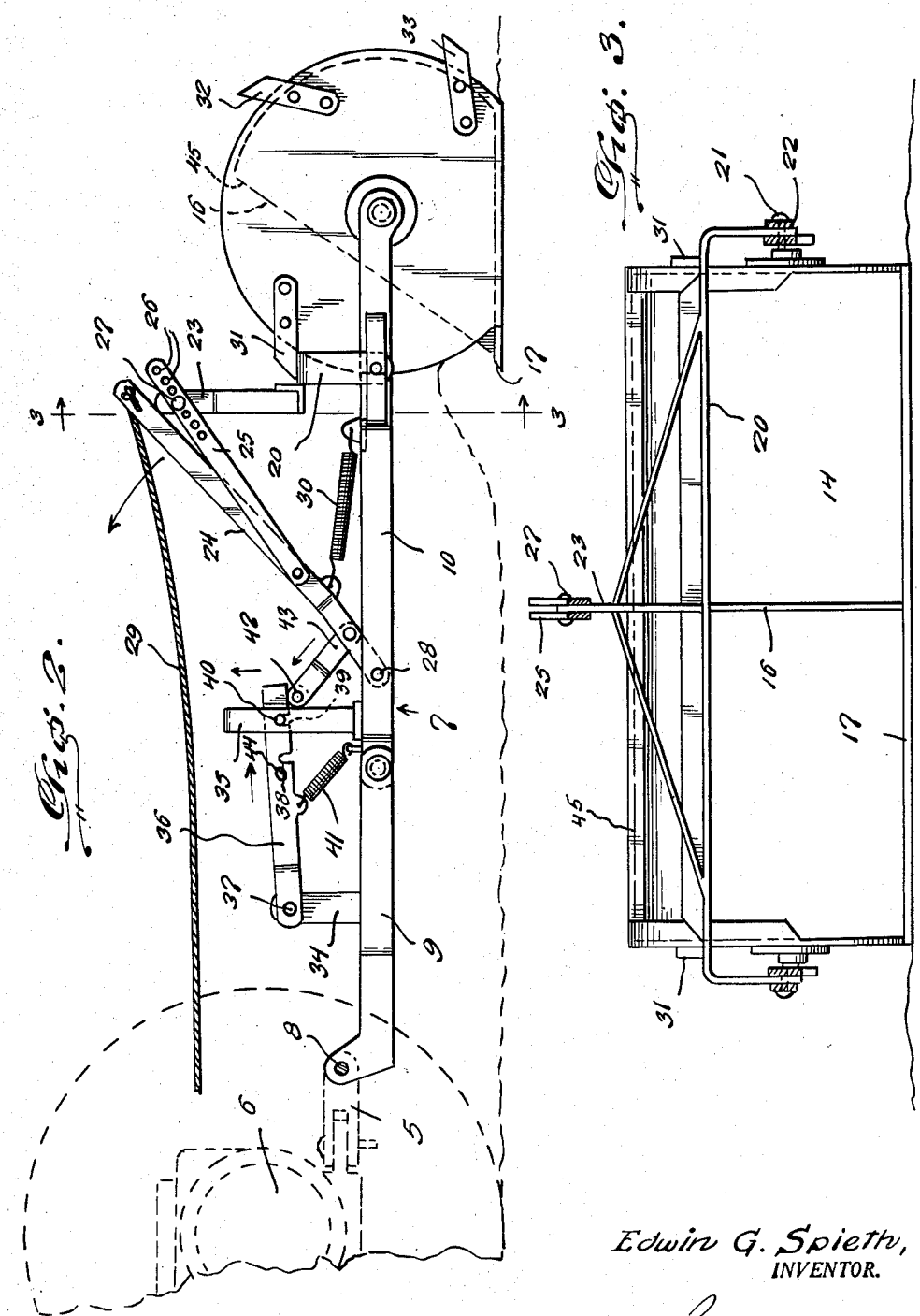

Patented July 11, 1950

2,514,810

UNITED STATES PATENT OFFICE 2,514,810

ROTARY SCRAPER

Edwin G. Spieth, Omaha, Nebr.

Application August 13, 1946, Serial No. 690,095

2 Claims. (Cl. 37—140)

The present invention relates to new and useful improvements in rotary scrapers of the class disclosed in my co-pending application Serial No. 615,655, filed September 11, 1945.

The invention embodies the provision of a rotary scraper bowl in which earth is dug by the scraper blade and deposited in the bowl and in which the material is discharged therefrom by permitting the bowl to roll on the ground, a drawbar being attached to a tractor for dragging the scraper bowl behind the tractor.

An important object of the present invention is to provide a pivoted drawbar composed of front and rear pivotally connected sections, the breaking of the drawbar in a downward direction increasing the depth of the cut of the scraper and providing lever-controlled locking means for securing the draw-bar in its raised or lowered position.

A further object of the invention is to provide a pivoted stop for securing the scraper bowl against rotation, together with an adjustable link connecting the stop to its control lever, whereby the stop may be secured in proper position for locking the bowl against movement in accordance with the raising and lowering movement of the drawbar.

A further object of the invention is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a side elevational view.

Figure 3 is a transverse sectional view on a line 3—3 of Figure 2.

Figure 4 is a fragmentary side elevational view of the latch bar for the sections of the drawbar and with parts shown in section.

Referring now to the drawings in detail, wherein for the purpose of illustration I have disclosed a preferred embodiment of the invention, the numeral 5 designates a conventional form of coupling of a tractor 6 and to which a sectional drawbar 7 is pivotally attached at its front end on a transverse pin 8 for vertical swinging movement of the front end of the drawbar.

The drawbar 7 includes front and rear sections 9 and 10, each comprising rearwardly diverging arms 11 and 12, respectively, the front ends of the arms 12 being pivotally connected to the rear ends of the arms 11 by means of a transverse pin 13, whereby to break the connected ends of the sections 9 and 10 in a vertical movement.

A cylindrical scraper bowl 14 is rotatably supported at the rear ends of the arms 12 of the rear section 10 of the drawbar by means of trunnions 15 at the ends of the bowl.

One side of the bowl is open, as indicated at 16, and one edge of the opening is provided with a transversely extending scraper blade 17.

Front and rear braces 18 and 19 rigidly connect the arms 12 in spaced-apart relation and an inverted U-shaped stop 20 is pivotally attached at its ends to the rear portions of the arms 12 by means of trunnions 21 pivoted in brackets 22 secured to the sides of the arms.

A post 23 rises from the central portion of the stop 20 to the upper end of which a lever 24 is connected by means of a pivoted link 25. The link is formed at its rear end with longitudinally spaced openings 26 in which a pin 27 carried by the post is selectively received. The lower end of the lever 24 is pivoted to the brace 18 by means of a pin 28, and to the upper end of the lever is attached a rope or cable 29 for operation by the driver of the tractor.

The lever 24 is yieldably maintained in its rearwardly inclined position by means of a coil spring 30 to hold the stop 20 in the path of a plurality of dogs 31, 32 and 33, disposed at circumferentially spaced intervals at the ends of the bowl 14 to secure the bowl against rotation.

A front post 34 rises from the front section 9 of the drawbar and a rear post 35 rises from the rear section 10. A latch bar 36 is pivoted at its front end to the front post 34, as at 37, and is formed at its lower edge with front and rear longitudinally spaced notches 38 and 39 for engaging a transverse pin 40 carried by the rear post 35. A coil spring 41 connects the latch bar 36 to the rear section 10 of the drawbar to hold the latch bar in engagement with the pin 40.

The rear end of the latch bar 36 projects rearwardly beyond the rear post 35 and under which is engaged a roller 42 journaled on the upper end of a forwardly inclined arm 43 pivoted to the lever 24, the roller also bearing against the post 35.

A stop 44 on the latch bar 36 limits rearward movement of the bar.

In the operation of the scraper, the bowl 14 is dragged over the ground at even keel with the dog 31 engaging the stop 20, and when the rear notch 39 of the latch bar 36 is engaging the pin 40, the drawbar will be held horizontally to scrape the surface of the ground by the blade 17, as shown in Figure 2.

When a deeper scraping cut is desired for the blade, the rope 29 is pulled slightly causing the lever 24 and arm 43 to be raised and roller 42 caused to raise the latch bar 36 in opposition to spring 41 while stop 20 still engages dog 31, whereupon the drawbar will break at its center and causes the blade 17 to be tilted downwardly. The latch bar 36 moves rearwardly to engage the front notch 38 on the pin 40 and locks the drawbar in its lower position.

To dump the load, the lever 24 is again pulled, but this time farther forward, releasing not only latch bar 36, but also releasing the stop from the dog 31 to permit rotation of the drum.

To drag the dumped load, the bowl is stopped in its rotation by engagement of the dog 32 with the stop 20 by releasing lever 24, allowing the springs 41 and 30 to act on the latter and bar 36, whereupon the blade 17 is held in a rearward position behind the bowl.

The bowl may be used as a bulldozer by a backing movement of the tractor causing a rotation of the bowl in a reverse direction until the dog 33 engages the under side of stop 20 and in that position the edge 45 of the bowl will be held in scraping contact with the ground.

The lever 24 is also used to raise the drawbar to its horizontal position, while roller 42 maintains the latch bar 36 raised against the inside of the top of U-shaped post 35 and thereby directly raises the rear drawbar section 10 and thus through pin 13 also raises front section 9 until rear notch 39 on the latch bar is over pin 40, whereupon release of lever 24 will engage the latch bar with said pin and lock the drawbar sections together in aligned horizontal position.

Having thus described my invention, what I claim is:

1. In a rotary scraper apparatus comprising a sectional drawbar composed of front and rear sections pivoted together for vertical breaking movement at their mutually connected ends, the rear section of the drawbar including a yoke-shaped hitch having rearwardly-directed arms, and a rotary scraper scoop rotatably mounted between said rearwardly-directed arms, the rotary scraper scoop having a substantially straight side terminating forwardly in a scraping edge and having a plurality of dogs upon said scraper scoop, the features which include a U-shaped locking member having the two limbs thereof pivotally mounted upon said rearwardly-directed arms and an intermediate transverse portion provided with a pivot mounting and rockable with said two limbs upon said arms toward the rotary scraper scoop in order to engage with and stop any one of the dogs on said rotary scraper scoop and thereby retain the latter stationary during forward travel of the rotary scraper apparatus, a rearwardly-inclined release lever pivoted on the rear drawbar section, a spring urging the release lever rearwardly, a post fixed upon said rear drawbar section having a stop member, a link pivotally connected at one end to an intermediate portion of the release lever and at the other end to said pivot mounting on said U-shaped locking member, a second post fixed on the front drawbar section, a rearwardly-directed latch bar pivotally connected at one end to the second post and having a pair of detents spaced apart upon the latch bar for engaging with said stop member to determine a rigid aligned relation between the two drawbar sections wherein the rotary scraper scoop is disposed on an even keel for level scraping and also another rigid relation wherein said rotary scraper scoop is inclined downward for deeper scraping, a second spring urging said latch bar to engage either of the detents with said stop member, and a forwardly-inclined arm pivoted at one end upon aforesaid release lever and having the other end abutting the first-mentioned post and a portion of said latch bar in effective position to release the latter bar from said stop member in opposition to said second spring upon rocking said release lever forward in opposition to said first-mentioned spring.

2. In a rotary scraper apparatus comprising a sectional drawbar composed of front and rear sections pivoted together for vertical breaking movement at their mutually connected ends, the rear section of the drawbar including a yoke-shaped hitch having rearwardly-directed arms, and a rotary scraper scoop rotatably mounted between said rearwardly-directed arms, the rotary scraper scoop having a substantially straight side terminating forwardly in a scraping edge and having a plurality of dogs upon said scraper scoop, the features which include an inverted U-shaped locking member having the two limbs thereof pivotally mounted upon said rearwardly-directed arms and an intermediate transverse portion provided with a pivot mounting and rockable with said two limbs upon said arms toward the rotary scraper scoop in order to engage with and stop any one of the dogs on said rotary scraper scoop and thereby retain the latter stationary during forward travel of the rotary scraper apparatus, a rearwardly-inclined release lever pivoted on the rear drawbar section, a spring urging the release lever rearwardly, a post rigidly mounted on said rear drawbar section and having an overhanging top portion and a fixed stop pin spaced below said top portion, a link pivotally connected at one end to an intermediate portion of the release lever and having a series of pivot apertures at the other end, a pivot member connecting one of said pivot apertures with the pivot mounting on said U-shaped locking member, a second post rigidly mounted on the front drawbar section, a rearwardly-directed latch bar having a pair of notches spaced apart in one edge thereof and projecting past the first-mentioned post between the overhanging portion and the stop pin thereon, said notches being independently adapted to engage with said stop pin to determine a rigid aligned relation between the two drawbar sections wherein the rotary scraper scoop is disposed on an even keel for level scraping and also another rigid relation wherein said rotary scraper scoop is inclined downward for deeper scraping, a second spring urging the latch member to engage either notch thereon with the stop pin, and a forwardly-inclined arm pivotally connected at the rear end thereof to an intermediate portion of said release lever and at the forward end having a roller directed toward the first-mentioned post and engaging beneath the rear end of the latch bar and effective to release the latter from said stop pin toward said overhanging top portion of said first-mentioned post in opposition to the second spring upon rocking said release lever forward in opposition to said first-mentioned spring.

EDWIN G. SPIETH.

REFERENCES CITED

The following references are of record in the file of this patent:

UNITED STATES PATENTS

| Number | Name | Date |
| --- | --- | --- |
| Re. 17,044 | Rose et al. | July 17, 1928 |
| 2,020,555 | Kerber | Nov. 12, 1935 |
| 2,076,939 | Cox | Apr. 13, 1937 |